E. G. BAILEY.
PRESSURE RELATION GAGE.
APPLICATION FILED MAR. 21, 1911.
1,153,413.
Patented Sept. 14, 1915.
2 SHEETS—SHEET 1.
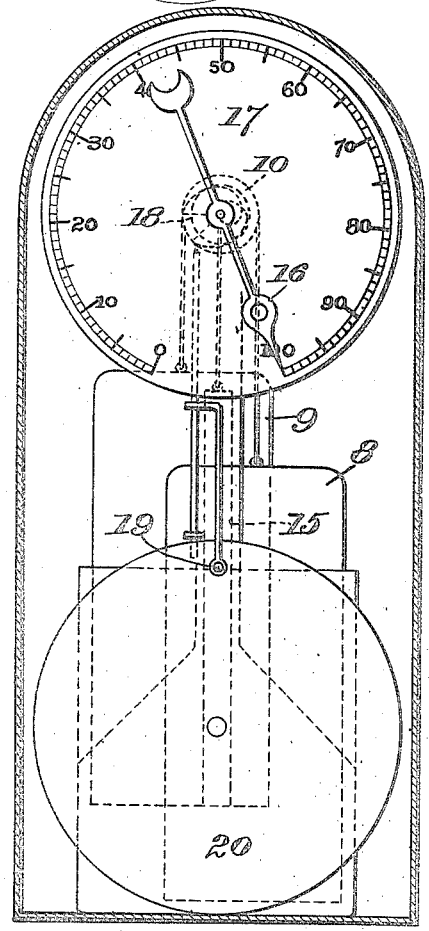
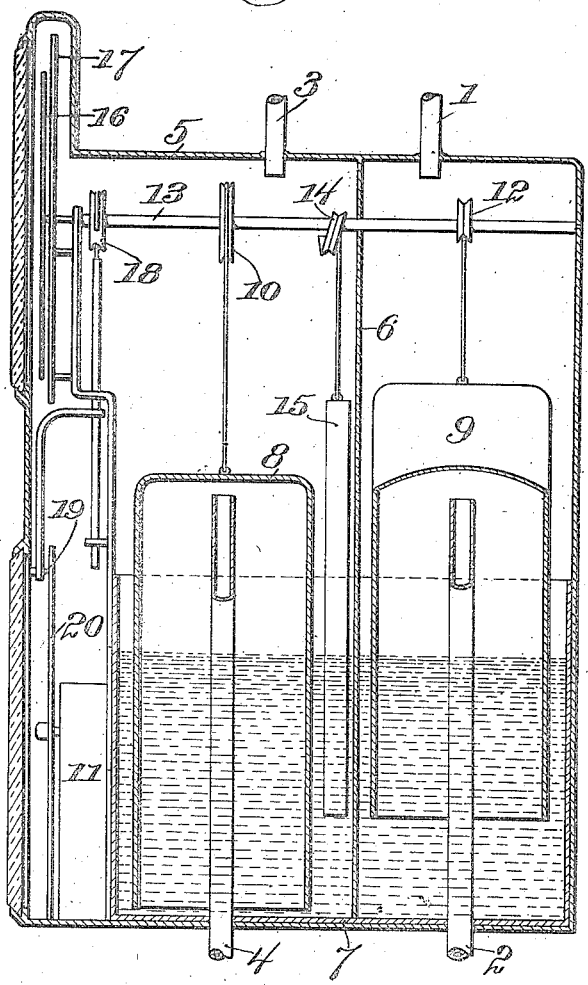
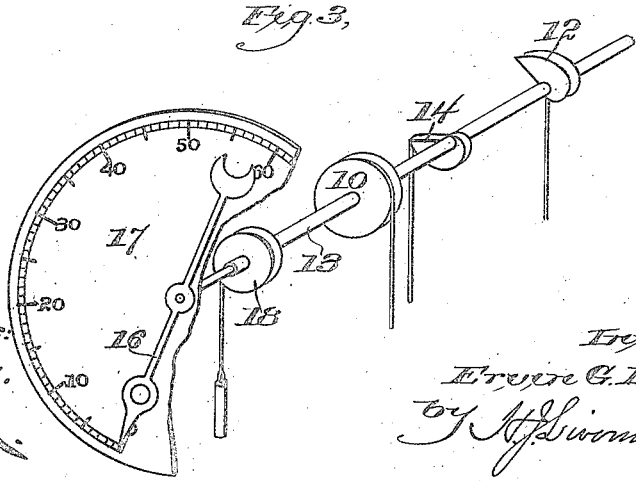

E. G. BAILEY.
PRESSURE RELATION GAGE.
APPLICATION FILED MAR. 21, 1911.

1,153,413.

Patented Sept. 14, 1915.
2 SHEETS—SHEET 2.

Witnesses:
Jas. J. Maloney

Inventor:
Ervin G. Bailey
by H. J. Simmon
Atty

UNITED STATES PATENT OFFICE.

ERVIN G. BAILEY, OF NEWTON, MASSACHUSETTS.

PRESSURE-RELATION GAGE.

1,153,413.

Specification of Letters Patent. Patented Sept. 14, 1915.

Application filed March 21, 1911. Serial No. 616,018.

*To all whom it may concern:*

Be it known that I, ERVIN G. BAILEY, a citizen of the United States, residing in Newton, in the county of Middlesex and State of Massachusetts, have invented an Improvement in Pressure-Relation Gages, of which the following description, in connection with the accompanying drawings, is a specification, like letters on the drawings representing like parts.

The present invention relates to a pressure relation gage, and is embodied in an instrument provided with an indicating, and, if desired, a recording device arranged to express the relation or ratio of a variable difference in pressures to other differences in pressure, whether variable or constant, without necessarily expressing the actual pressures or pressure differences.

The instrument is adapted for various uses, as, for example, for indicating the internal conditions of fluid conducting conduits so far as such conditions affect the resistance to flow of the fluids, or for use in indicating the proportional quantities of fluid flowing through separate ducts in multiple.

While several different types and forms of construction can be used in the practical embodiment of this invention, the operation in all cases depends upon the principle of balancing moments about a single axis by changing the magnitude of some of the forces or moment arms with respect to the others in accordance with any desired rate of angular rotation. The manner of applying these forces is such that the amount of angular rotation of the shaft necessary to bring about a state of equilibrium is a measure of the degree of change which has taken place in the relation of various pressures to others, and which change has caused the rotation of the shaft. In some types of instruments the moment arms upon which one or more pressures act are varied with the angular rotation about the axis, while other moment arms remain constant or vary at a different rate; and in other types the moment arms upon which the various pressures act remain constant and the amount of force produced from any given pressures or differences of pressures is changed by the rotation of the mechanism about the axis, while other forces remain constant or vary at a different rate at the same time.

Figure 4:
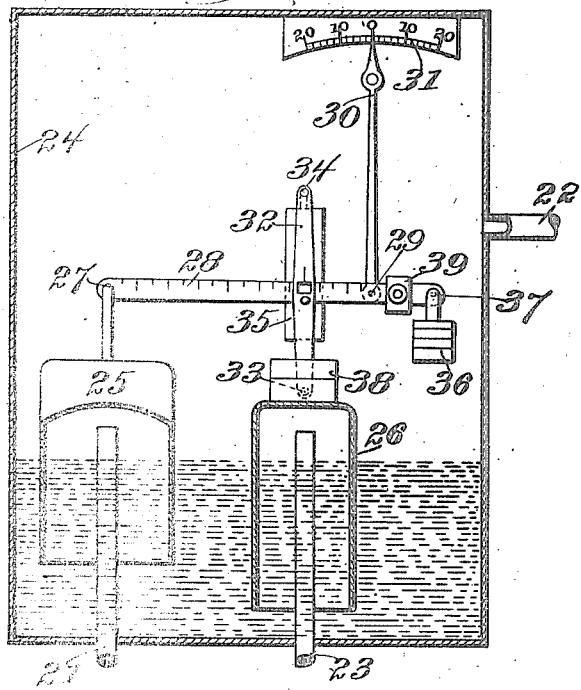
Figure 5:
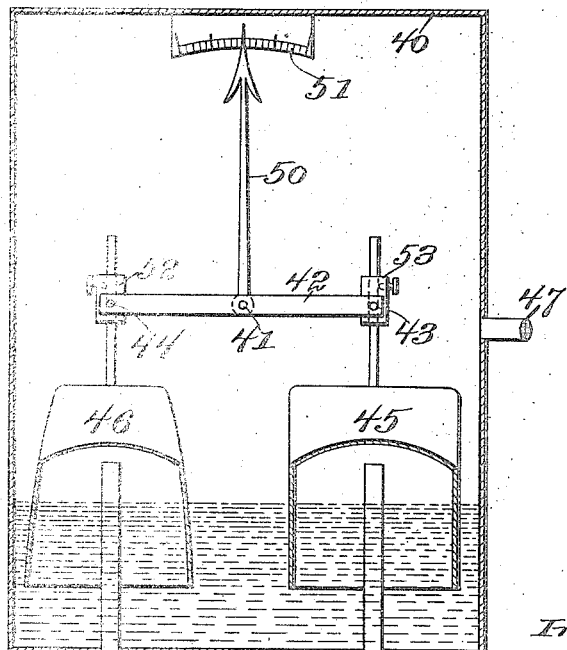

Figure 1 is a front view, partly in section, of an instrument embodying the invention; Fig. 2 is a section, through the middle of Fig. 1; Fig. 3 is a detail, in perspective, showing the oscillating member, the pointer, and a portion of the dial; Fig. 4 is a vertical section showing an instrument of modified construction; and Fig. 5 is a similar view showing a further modification.

While the use of this instrument is not limited to any one particular system, its functions can be more readily understood if described in connection with one or more specific systems, such as a system involving a proportional flow of air and gas to a furnace through ducts, and, as another example, a system in which solid fuel is used in inclosed fuel beds.

Referring to Figs. 1, 2 and 3, in the application of this type of instrument to a system in which it is desired to indicate the proportional flow of air and gas to a furnace, pipes 1 and 2 are respectively connected to the dynamic and static nozzles of a Pitot tube in the air duct, or any other equivalent device so that the difference between the pressures conveyed to the instrument by these pipes is a function of the rate of flow of air to the furnace. Pipes 3 and 4 are connected into the gas duct in a similar manner, so that the difference between the pressures in them is a function of the rate of flow of gas to the furnace. The instrument consists of a closed case 5, having a partition 6, which divides the case and a vessel 7, containing a liquid, into two separate compartments. Within these compartments, two movable pressure actuated abutments, shown as bells 8 and 9 are so suspended by flexible connections from a sheave 10 and a cam 12 that their lower open ends dip into the liquid so as to seal the space within the bells. The pipe 1 connects into the compartment containing the bell 9, while pipe 2 connects into the same compartment, but is arranged so as to be in communication with the space within bell 9, above the liquid. In like manner, pipes 3 and 4 connect into the compartment containing the bell 8, so that in both cases the preponderance of pressure in the pipes 1 and 3 over that in the pipes 2 and 4, respectively, exerts force which tends to move each bell downward. The sheave 10 and the cam 12, from which the bells 8 and 9 are respectively suspended, are fastened on an oscillatable member such as a shaft 13, and the sheave and cam are so shaped with relation to each other that there is a definite relation between the lengths of their supporting radii for any one position of the shaft, and this relation changes in a definite manner as the shaft rotates. Attached to the shaft 13 is a cam or sheave 14, from which is suspended a counterpoise 15 by means of a flexible connector. The cam 14 is so shaped with respect to the weight of the counterpoise 15 and the moments produced by the weight of bells 8 and 9 acting upon the respective radii of their sheaves for various positions of the shaft, that the moment produced by counterpoise 15 acting upon the corresponding radius of sheave 14 will produce equilibrium of the entire moving mechanism for any position of the shaft 13. This also includes the change in effective weights of the bells and counterpoise due to the variation in buoyancy for different depths of submersion corresponding to the position of shaft 13.

The moments due to the weights of all mechanism suspended from the shaft 13 being balanced for any angular position of the shaft, it is evident that the shaft is free to turn on its axis in response to the moments due to the differences of pressures which may be applied to the bells. If the forces are equal, the shaft will turn on its axis until the moment arms of the bells or the effective radii of the cam 12 and the sheave 10 are equal, or if the forces are unequal the shaft will take such a position that the effective radii are inversely proportional to such forces resulting from the differences of pressures applied thereto. By means of a pointer 16 attached to the shaft 13 and moving over a scale 17, the relation between the differences of pressures may be indicated continuously, and by means of a sheave 18 and pen 19 suspended therefrom and moving over chart 20, which chart is moved by a clock 11, this relation can be recorded. This indicated or recorded relation can be denoted in any desired units, such as cubic feet of air per cubic foot of gas, percentage of one pressure or difference of pressure to another, etc.

In some cases it is desirable to have the bells 8 and 9 of uniform area of cross section, while in other cases it is necessary to vary the area of one bell with respect to the other in order to secure the desired relation between the various pressures.

Referring to Fig. 4, the modified instrument shown is particularly adapted for use in indicating the relation existing between two or more differences of pressures where one pressure is common to all others so far as difference of pressures is concerned, and it may be greater than some and less than others, such as the case of a boiler and furnace where it is desired to indicate the relation of the drop in pressure across the fuel bed to the drop across some other resistance in series therewith, such as that offered by the tubes of the boiler. Pipe 21 is connected into the uptake or the space beyond the boiler tubes, pipe 22 into the fire box, pipe 23 into the ash pit or space beneath the grate, and each transmits the pressure from the respective parts of the boiler and furnace to the instrument. The instrument proper consists of a closed case 24 containing a liquid in the lower part, into which bells 25 and 26 dip. Bell 25 is supported by pivot 27 from the oscillating beam 28, which is mounted on the fixed pivot or shaft 29, and since the pipe 21 is connected to the space within bell 25 above the liquid, and the pipe 22 is connected into the case 24 outside of the bell 25, the preponderance of pressure is outside of the bell 25, so that said bell tends to be forced downward in accordance with the preponderance of pressure in pipe 22 over that in the pipe 21. Such a movement, if it takes place, will move the beam 28 on its axis and move the pointer 30 over the scale 31. At some position on the beam 28 between the pivots 27 and 29 is fastened a cross arm 32, which has a pivot 33 supporting the bell 26, and a pivot 34 supporting a counterweight 35. The pipe 23 is connected to the space within bell 26 above the liquid, and the pressure conveyed by pipe 22 acts upon the outside of the bell 26 so that a preponderance of pressure conveyed through the pipe 23 over that conveyed through the pipe 22 will tend to raise the bell 26 and move the beam in the direction opposite to that produced by the difference of pressures applied to bell 25. A counterweight 36 is supported from the pivot 37 and counterbalances the moments produced by the weight of bells 25 and 26 and other mechanism on the opposite side of the pivot 29 supporting the beam 28 when said beam is standing in its normal position. The weight 38 on the bell 26 is such as to overcome the effect of the maximum difference between the pressures above and below the bell 26, so that the force exerted on pivot 33 will always be downward, but will diminish as the difference between the pressures increases.

For any given relation between the area of bell 25 and its moment arm, as compared with the area of bell 26 and its moment arm, a certain relation may exist between the pressures communicated through the pipes 21, 22 and 23, without causing any unbalanced moments or motion. For instance, if there is a certain desired relation between the drop in pressure across the fuel bed to the drop in pressure across the boiler tubes, the instrument would be so adjusted that beam 28 would remain in its normal position so long as this relation between the different drops in pressures existed, regardless of the intensities of such pressures. However, in case there is a deviation from this relation between the different drops in pressure, it is evident that there will be an unbalanced moment produced which will tend to move the beam in the corresponding direction. If the difference in the pressures communicated through the pipes 22 and 23 becomes greater in proportion to the difference in the pressures communicated through pipes 22 and 21, there will be a decreased downward force exerted upon pivot 33 and beam 28, which tends to turn the beam clockwise about pivot 29, and during this movement the moment arm of bell 25 will remain practically the same, since the movement of the pivot 27 is very nearly vertical. The pivot 33, however, is so positioned with relation to the pivot 29 that, in the movement of said pivot 33 it has a material lateral component as well as a vertical component, so that the effective moment arm of the bell 26 is increased with the movement and this increase in the moment arm of the net force acting upon pivot 33 causes an increase in the moment of force, as compared with the same force acting in the former position, and tends to restore equilibrium. The counterweight 35 is so pivoted at 34 that as the beam rotates, the point of support of the counterweight revolves about pivot 29 and the effective moment arm of the counterweight is diminished as the moment arm of the bell 26 is increased, and vice versa. The actual weight of the counterweight 35 is so proportioned with respect to the weight of the bell 26 plus that of the weight 38 that equilibrium of moments due to the weights of the mechanism is substantially maintained for any angular position of the beam 28 within the intended range of the instrument, so that the position taken by the beam 28 is an indication of the amount of deviation which has taken place in the differences of pressure from any one ratio or relation of such differences. The pointer 30 is attached to the beam 28 and moves over the scale 31 and thereby indicates the proportional change in the relation of one difference of pressure to another from any desired relation for which the instrument is set. In the case of different boilers and different coals the relation of drop in pressure across the fuel bed and the drop in pressure across the boiler may vary, but this type of instrument may be used for any of these conditions by merely changing the position of the cross arm 32 on the beam 28; or by changing the area bell 26 with respect to the horizontal projection of the distances between pivots 29 and 33, and between the pivots 29 and 27, and also with respect to the area of the bell 25 and suitably changing the counterweight 35 and the weight 36 which is hung on the end of the beam or the position of the weight 39, which may be considered as part of the weight 36; so that equilibrium is maintained when the desired relation exists. The instrument will then indicate the nature and extent of deviations from the desired relation.

In some cases it is desirable to use an instrument of this type for indicating the relation between the drop in pressure across the fuel bed to the drop in pressure across the fuel bed added to the drop in pressure across some substantially constant resistance in series therewith, such as that due to the boiler tubes. In this case the pressure in the ash pit is common to both differences of pressure, and this instrument would be slightly modified by hanging the pressure receiving bells from an oscillatable member consisting of a beam at opposite sides of the pivotal support, connecting the ash pit pressure into the space outside of the bells, and connecting the space within the bells to the fire box and the uptake, respectively, so that the forces acting on the bells would both be downward and would tend to rotate the beam 28 in opposite directions.

Referring to Fig. 5, the instrument shown has generally the same elements as those employed in the instruments shown in Figs. 1 to 4. In this instrument, however, any change in the relation between the differences of pressures which produce motion also causes a balancing of moments by changing the intensity of force produced by any given difference in pressure, and retains substantially the same length of moment arms, so that the amount of motion is an indication of the amount of relative change in the differences of pressures. This instrument is provided with a closed case 40, and a fixed pivot 41 supporting a beam 42; and from pivots 43 and 44 on this beam, are supported bells 45 and 46, respectively, which bells dip into and are sealed by the liquid contained in the lower part of the case. The space within the case 40, outside of the bells, is connected by a pipe 47 with the ash pit. The space within the bell 45 above the liquid is connected by a pipe 48 with the fire box. The space within the bell 46 and above the liquid is connected by a pipe 49 to the uptake. The preponderance of pressure in the ash pit over the pressure in the fire box acting upon the bell 45 will cause a resulting force to be exerted downwardly on pivot 43, which force is in proportion to the difference between the pressures acting upon the bell 45; and the said force will tend to cause movement of the beam 42 about its pivot 41. In like manner, the preponderance of pressure communicated through the pipe 47 over that communicated through the pipe 49, in acting upon the bell 46, will cause a resulting force acting downwardly on the pivot 44 and will tend to cause the rotation of the beam in the opposite direction. In the drawing, the bell 45 is shown as having a constant area while the area of the bell 46 varies with respect to its height, so that as the beam 42 moves, the bell 46 will become more or less deeply submerged in the liquid, thereby changing the effective area of the bell which is at the surface of the liquid, and is acted on by the pressure. The force due to any difference between the pressures above and below the bell 46 is represented by the volume of liquid sustained within the bell 46 above the level of the liquid in the space surrounding the said bell. The height at which this liquid stands within the bell 46, as compared with the height of the liquid outside of the bell, is definitely proportional to the difference in the pressures communicated through the pipes 47 and 49; but the area being variable with the height of the bell 46, it is obvious that the force resulting from any difference of the pressures transmitted by pipes 47 and 49 will vary with the position of the beam 42. The instrument is so adjusted that while any given relation exists between the various pressures communicated to this instrument, the movable parts will remain in equilibrium. If, however, any change in this relation takes place, such as the difference of pressures acting on the bell 46 becoming greater, while the difference in pressures acting on the bell 45 remains the same, an unbalanced moment is produced, and the beam 42 will be turned counter-clockwise until the bell 46 becomes more deeply submerged in the liquid; and the mean area of the liquid sustained within the bell will decrease as the bell is lowered, so that the volume will remain substantially constant, and the mechanism comes to rest through the restoration of a state of equilibrium. By properly proportioning the area of the bell 45, the moment arms represented by the parts of the beam lying, respectively, between the pivots 41 and 43, and the pivots 41 and 44, and also properly proportioning the variable area of cross section of the bell 46, and the case 40 at the surface of the liquid the instrument can be arranged to indicate the nature and extent of variation from any desired relation between the various pressures communicated within reasonable limits of accuracy. The position taken by the beam 42 is denoted by the pointer 50 on the scale 51, and a recording attachment may be used in a similar manner. In order to change the relation which it is desired to have exist between the various pressures for any given position of the pointer 50 with respect to the scale 51, it is only necessary to raise or lower the bell 46 with respect to the liquid, which may be accomplished by sliding the support for said bell in the pivot block 52, or, leaving this the same, by merely changing the amount of liquid in the case. The bell 45 may be similarly adjusted in the pivot block 53.

In cases where the pressure applied through the pipe 47 is greater than the pressure applied through the pipe 49, but is less that the pressure applied through the pipe 48, the pivots 43 and 44 would both be located upon the same side of the pivot 41, and the resulting forces would then tend to cause rotation in opposite directions about the pivot 41 in a manner similar to that described in connection with Fig. 4.

Bells having a variable relative area of cross section may be used in types of instruments illustrated in Figs. 1, 2 and 3, and constant radius sheaves used in either case, or if a more complicated relation is desired or certain corrections are to be made, a combination of variable area bells supported from sheaves of variable radii may be used in order to accomplish the desired results.

In all the types of machines illustrated in this application, the moments produced by differences in pressures automatically balance themselves by changing either the length of moment arms upon which the forces act, or else by changing the force due to any given difference of pressures in response to the movement of some part of the mechanism so that the amount of motion will indicate the nature and extent of the change in the relation between the various pressures.

What I claim is:

1. In a pressure relation gage, the combination with bell-shaped abutments adapted to receive fluid pressures on opposite sides; of an oscillatable indicating member; means for connecting the said abutments to the indicating member at points away from the axis of oscillation, whereby moments are produced by the pressures acting on said abutments, respectively, which moments tend to move said indicating member in opposite directions; means for balancing said moments to establish a state of equilibrium; and means for maintaining said moments in a state of equilibrium by progressively varying the relation between the forces or elements which compose said moments, in response to the movement of said indicating member, whereby the extent of movement is a measure of the relation between the various pressures applied to opposite sides of the different abutments.

2. In a pressure relation gage, the combination with a plurality of movable abutments each adapted to receive fluid pressures on opposite sides; of an oscillatable indicating member; means for connecting said abutments to said oscillatable member, whereby moments about a common axis of rotation are produced by the pressures acting on said abutments; and means for causing the relative intensities of said moments to vary as the oscillatable member moves, whereby the resultant of said moments is automatically maintained substantially at zero, so that the extent of movement of the indicating member corresponds to the change in the relation of the pressure differences to one another.

3. In a pressure relation gage, the combination with an oscillatable member provided with projecting parts, of pressure actuated devices connected, respectively, with said projecting parts which constitute the moment arms through which the pressure actuated devices operate; and means whereby one moment of force is varied with relation to the other moment of force, in response to the movement of the said member.

4. In a pressure relation gage, the combination with an oscillatable member provided with projecting parts; of pressure actuated devices connected, respectively, with said projecting parts which constitute the moment arms through which the pressure actuated devices operate; and means whereby the relative lengths of the said moment arms are varied in response to the movement of the member around its axis.

5. In a pressure relation gage, the combination with bells adapted to receive pressures on opposite surfaces, of pipes or ducts affording communication between sources of pressure and the said bells; an oscillatable indicating member connected with said bells at different points away from its axis whereby moments are produced by the pressures acting on said bells which tend to rotate the said member in opposite directions; and means whereby the said moments are varied with relation to each other in response to the movement of the oscillatable member, so that a state of equilibrium will be reached and indicated when the position of said oscillatable indicating member denotes a definite relation between the pressure differences.

In testimony whereof, I have signed my name to this specification in the presence of two subscribing witnesses.

ERVIN G. BAILEY.

Witnesses:
  JAS. J. MALONEY,
  W. E. COVENLY.